United States Patent [19]
Isard et al.

[11] 3,929,886
[45] Dec. 30, 1975

[54] QUATERNARY AMMONIA SALTS OF POLYHALOGENATED AROMATIC COMPOUNDS

[75] Inventors: Arsene Isard, Grenoble; Ludovic Parvi, Pont-de-Claix, both of France

[73] Assignee: Products Chimiques Ugine Kuhlmann, Paris, France

[22] Filed: Mar. 15, 1973

[21] Appl. No.: 341,374

Related U.S. Application Data
[63] Continuation of Ser. No. 17,935, March 9, 1970, abandoned.

[30] Foreign Application Priority Data
Mar. 18, 1969  France .............................. 69.07630

[52] U.S. Cl. .................... 260/567.6 R, 567.6 M, 260/567.6 P
[51] Int. Cl.² ................................. C07C 93/08
[58] Field of Search 260/567.6 R, 567.6 M, 567.6 P

[56] References Cited
FOREIGN PATENTS OR APPLICATIONS

| | | |
|---|---|---|
| 2,038,503 | 1/1971 | France |
| 493,865 | 10/1938 | United Kingdom ......... 260/567.6 M |
| 672,708 | 5/1952 | United Kingdom ......... 260/567.6 M |
| 1,020,031 | 5/1958 | Germany |

OTHER PUBLICATIONS
Ponci et al., Chem. Abstracts, Vol. 61, 8217–8219 (1964).

*Primary Examiner*—James O. Thomas, Jr.
*Assistant Examiner*—James H. Reamer
*Attorney, Agent, or Firm*—Pennie & Edmonds

[57] ABSTRACT

New quaternary ammonium salts corresponding to the general formula

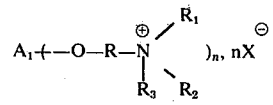

in which Ar represents a polyhalogenated aromatic radical such as pentachlorophenyl, octachlorobiphenylene, octabromobiphenylene, hexachlorodibromobiphenylene, dodecachloroterphenylene, etc. R, $R_1$, $R_2$, $R_3$ represent a hydrocarbon aliphatic, cycloaliphatic or arylaliphatic radical or substituted aliphatic, cycloaliphatic or arylaliphatic radical in which substituted groups are selected from heteroatoms such as O or S, or methyl, ethyl, isopropyl, βchloroethyl, allyl, methallyl, benzyl, chlorobenzyl, morpholyl, methylthioethyl; groups and so forth, $X^\theta$ is a halogenide, an alkylsulfate containing from 1 to 20 carbon atoms or an arylsulfonate anion, and $n$ is an integer from 1 to 3, and a process for manufacturing the above compounds by reacting a tertiary amine of the formula:

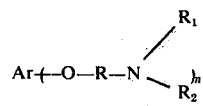

in the presence of an inert solvent with an alkylation reagent $R_3X$ in which the designations Ar, R, $R_1$, $R_2$, $R_3$ have the same meaning as indicated hereinabove.

The quaternary ammonium salts of this invention are useful as phytosanitary or plant sanitizing agents. The products are particularly useful as bactericides and fungicides on plants.

6 Claims, No Drawings

QUATERNARY AMMONIA SALTS OF POLYHALOGENATED AROMATIC COMPOUNDS

This is a continuation, of application Ser. No. 17,935, filed Mar. 9, 1970, now abandoned.

SUMMARY OF THE INVENTION

The present invention relates to new quaternary ammonium salts corresponding to the general formula (I) 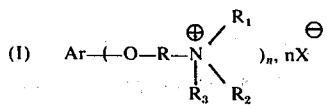

in which Ar represents a polyhalogenated aromatic radical such as pentachlorophenyl, octachlorobiphenylene, octabromobiphenylene, hexachlorodibromobiphenylene, dodecachloroterphenylene, etc. R, $R_1$, $R_2$, $R_3$ represent a hydrocarbon aliphatic, cycloaliphatic or arylaliphatic radical or substituted aliphatic, cycloaliphatic or arylaliphatic radical in which substituted groups are selected from heteroatoms such as O or S, or methyl, ethyl, isopropyl, βchloroethyl, allyl, methallyl, benzyl, chlorobenzyl, morpholyl, methylthioethyl, groups and so forth, $X^-$ is a halide, an alkylsulfate containing from 1 to 20 carbon atoms or an arylsulfonate anion, and $n$ is an integer from 1 to 3.

The invention also includes a process for manufacturing the above compounds by reacting a tertiary amine of the formula (II) 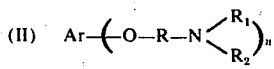

in the presence of an inert solvent with an alkylation reagent $R_3X$ in which the designations Ar, R, $R_1$, $R_2$, $R_3$ and $n$ have the same meaning as indicated above and in which X is a halogen such as chlorine, bromine, iodine or fluorine, an alkyl sulfate radical containing 1 to 20 carbon atoms or an aryl sulfonate radical.

DETAILED DESCRIPTION OF THE INVENTION

The amines of formula (II) from which the novel products of this invention are obtained can be prepared in known manners by those skilled in the art. One manner by which these amines can be easily produced is disclosed in copending United States application Ser. No. 820,310, filed Apr. 29, 1969. The above U.S. application is assigned to the same assignee as the present application and the contents thereof are incorporated herein by reference.

The reaction to produce the quaternary ammonium products of this invention can be carried out in the presence of inert solvents such as benzene, monochlorobenzene, dioxane, carbon tetrachloride, etc. In place of the inert solvent an excess of the alkylation reactant $R_3X$ can also be advantageously employed.

The reaction conditions (time, temperature, pressure, etc.) which can be employed to form the new quaternary ammonium salts of this invention can be varied quite widely and will depend mainly upon the particular alkylation reactant $R_3X$ being used to react with the amines of formula (II). For example, the reaction is quite rapid when allyl chloride is used as the alkylating agent and fairly slow and sometimes incomplete when the alkylating reagent used is dichlorethane.

The temperature of the reaction between the amine of formula (II) and the alkylating agent is generally determined by the boiling point of the solvent when the reaction is being carried out under atmospheric conditions but the reaction temperature can of course be higher if the reaction is carried out under pressure. It is generally advantageous to carry out the reaction at a temperature ranging between about 50° and 250°C.

The new quaternary ammonium salts of this invention are useful as phytosanitary or plant sanitizing agents. The products are particularly useful as bactericides and fungicides on plants. The new quaternary ammonium salts of this invention can be used in the original form but it is preferable to utilize the products in the form of solutions, emulsions, powders, pastes, granules, and so forth and can be readily produced in these forms for application by manners well known to those skilled in the art.

The following examples further illustrate the quaternary ammonium salts and methods of preparation according to the invention.

EXAMPLE I 125 gms. of decachlorobiphenyl, 44.5 gms. of N,N-dimethyl ethanolamine, 28 gms. of NaOH, in flakes, and 310 cm³ of dioxane were placed in a reactor. These compounds were kept at the boiling point for 3½ hours, then filtered and, the reaction mixture neutralized with $CO_2$. The resulting precipitate was then washed several times by decantation in distilled water, and then dissolved in methylene chloride. The solution was evaporated, and 147 gms. of the condensation product recovered which titrated 48.6 percent chlorine and 4.1 nitrogen.

EXAMPLE II

A mixture of 150 gms. of allyl chloride and 60 gms. of the amine product produced according to Example I was kept boiling at reflux for a period of 5 hours in a suitable reaction vessel. At the beginning of the reaction a precipitate formed whose volume increased progressively during the reaction. After cooling, filtering and drying of the precipitate, 64 gms. of a white powder were obtained. The precipitate was soluble in alcohol, fairly soluble in water and contained:

| | |
|---|---|
| Ionizable chlorine | 0.22 eq/100 gms. |
| Nitrogen | 3.2 percent |
| Total chlorine | 47.1 percent | and was mainly a quaternary ammonium salt of the following structure:

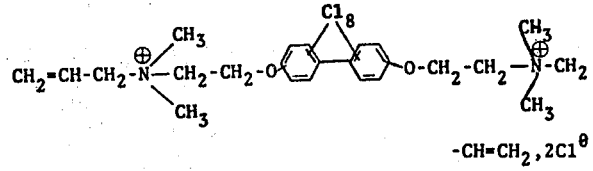

EXAMPLE III

A mixture of 57 gms. of the amine compound, as produced in Example I, and 150 gms. of dichloro-1-2 ethane were kept boiling at reflux for a period of 10 hours in a suitable reaction vessel. After cooling, the reaction mixture was treated with ether in order to eliminate the dichloroethane and the amine which did not react. The paste-like solid which was left was washed in ether and then dried. 30 gms. of a solid were thus obtained consisting essentially of the quaternary ammonium salt of the following structure:

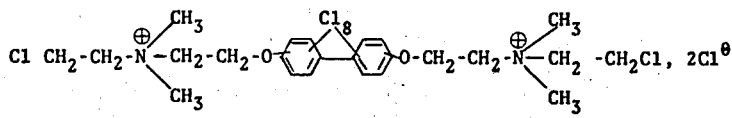

containing:

| | |
|---|---|
| Ionizable chlorine | 0.221 eq/100 gms. |
| Nitrogen | 3.59 percent |
| Total chlorine | 50.3 percent |

EXAMPLE IV 142 gms. of hexachlorobenzene, 44.5 gms. of N-N-dimethyl-ethanolamine, 28 gms. of NaOH, in flakes, and 500 cm³ of dioxane were placed in a reaction vessel. The mixture was kept at boiling point temperature for 3½ hours the reaction mixture then further treated in the same manner as set forth in Example I. The final product was N-N dimethylamino-2-ethoxy-pentachlorobenzene.

EXAMPLE V

A mixture of 60 gms. of the amine obtained in Example IV and 120 gms. of allyl chloride were heated under reflux for 10 hours in a suitable reaction vessel. After cooling the reaction mixture, 72 gms. of a white solid was separated by filtration, corresponding to the formula

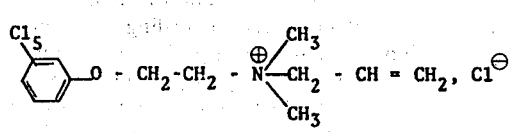

containing:

| | |
|---|---|
| Ionizable chlorine | 0.23 eq/100 gms. |
| Nitrogen | 3.4 percent |
| Total chlorine | 50.1 percent |
| Ethylenic groups | 0.27 eq/100 gms. |

Other amines coming within the scope of formula (II) can be prepared in the same manner as set forth for preparing the amines in Examples I and IV as will be apparent to those skilled in the art.

We claim:

1. Quaternary ammonium salts corresponding to the general formula:

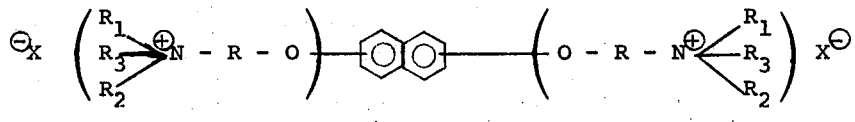

in which the biphenyl radical is polyhalogenated; R is a lower alkylene group; $R_1$, $R_2$ and $R_3$ each represents an unsubstituted alkyl or cycloalkyl radical, or a halogen substituted alkyl or cycloalkyl radical, or a lower alkyl substituted cycloalkyl radical; and $X^-$ is a halide, an alkylsulfate containing from 1 to 20 carbon atoms or an arylsulfonate anion.

2. Quaternary ammonium salts according to claim 1 in which the biphenyl radical is perhalogenated.

3. Quaternary ammonium compound of claim 2 wherein $R_3$ is a monosubstituted chloroallyl radical.

4. Quaternary ammonium salts according to claim 2 in which $R_1$, $R_2$ and $R_3$ each represent a unsubstituted or halo substituted lower alkyl radical of from 1 to 3 carbon atoms, $X^-$ is a halide.

5. A quaternary ammonium salt of the formula:

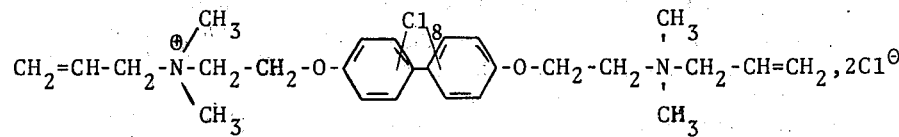

6. The quaternary ammonium compound having the formula

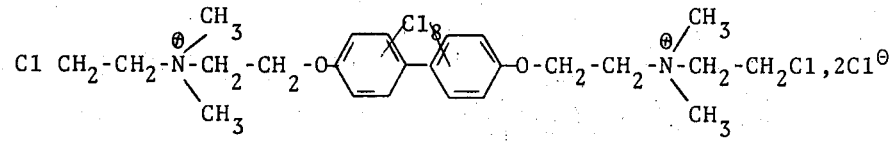

* * * * *

UNITED STATES PATENT AND TRADEMARK OFFICE
CERTIFICATE OF CORRECTION

PATENT NO. : 3,929,886
DATED : December 30, 1975
INVENTOR(S) : ARSENE ISARD ET AL.

It is certified that error appears in the above-identified patent and that said Letters Patent are hereby corrected as shown below:

First page, amend the "Assignee" to read -- Produits Chimiques Ugine Kuhlmann, Paris, France --.

Column 1, line 27, delete "$X^-$" and substitute therefor -- $X^\ominus$ --.

Column 2, line 34, delete "147" and substitute therefor -- 14.7 --.

Column 4, line 26, delete "$X^-$" and substitute therefor -- $X^\ominus$ --.

Column 4, claim 5, line 2, amend the right-hand moiety to read as follows:

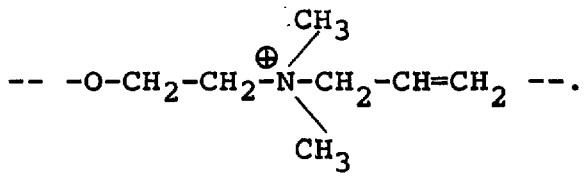

Signed and Sealed this

Twenty-fourth Day of August 1976

[SEAL]

Attest:

RUTH C. MASON
Attesting Officer

C. MARSHALL DANN
Commissioner of Patents and Trademarks